Oct. 31, 1944.    C. H. HARRIS ET AL    2,361,398
PORTABLE PROJECTOR ASSEMBLY
Filed Nov. 3, 1941
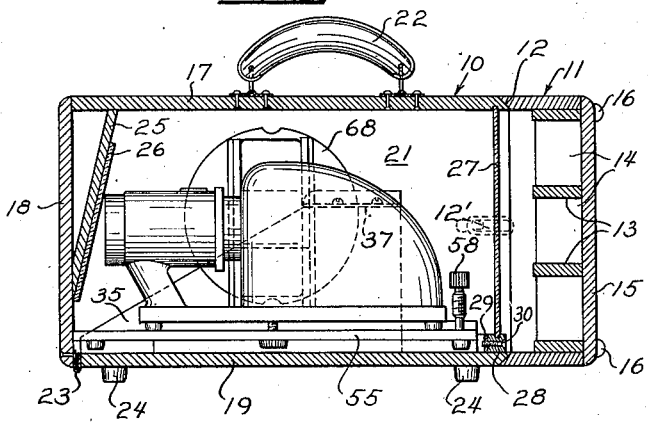
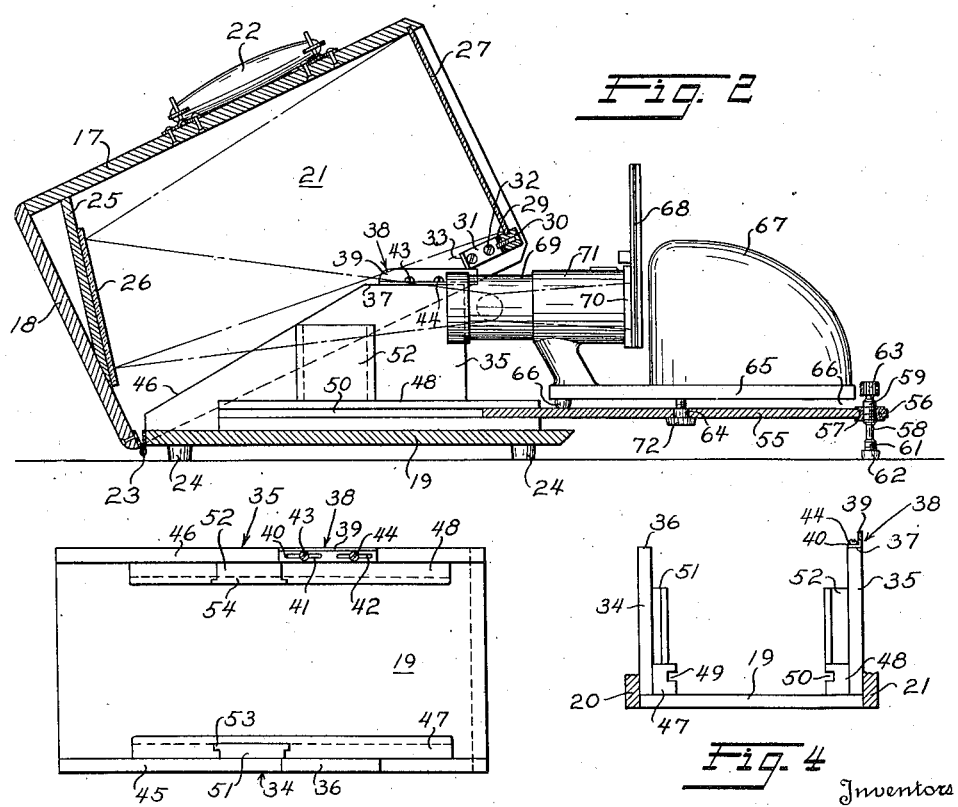
Inventors
Clinton H. Harris
John N. Graef
By Strauch & Hoffman
Attorneys Patented Oct. 31, 1944

2,361,398

UNITED STATES PATENT OFFICE 2,361,398

PORTABLE PROJECTOR ASSEMBLY

Clinton H. Harris and John N. Graef, Ann Arbor, Mich., assignors to Argus, Incorporated, a corporation of Michigan Application November 3, 1941, Serial No. 417,688

12 Claims. (Cl. 88—24)

This invention relates to portable projector assemblies and is more particularly concerned with portable projector assemblies wherein projection apparatus and a viewing screen are transported in a special carrying case which when opened provides support for holding the projection apparatus and screen in operative relation for projecting and viewing pictures.

It is a major object of the invention to provide an inexpensive, lightweight, self-contained portable projector assembly which embodies novel structural details for holding and locating projection apparatus in condition for carrying about or for picture projecting and is easily and quickly set up for projecting and viewing pictures.

A further object of the invention is to provide an openable portable projector carrying case having novel arrangements for holding the case open and shifting and holding the projector in alignment with a viewing screen carried by the open case which thereby supports the projector and screen in operative relation.

A further object of the invention is to provide a novel portable projector assembly wherein a special carrying case comprising a pair of hingedly connected sections has a viewing screen fixedly mounted on one section and a projector unit slidably carried on the other section.

A further object of the invention is to provide a portable projector assembly having a carrying case of novel construction wherein a picture projector is carried on a shiftable support within the case and the support is provided with selectively operable levelling mechanism.

Further objects of the invention will presently appear as the description proceeds in connection with the appended claims and the annexed drawing in which Figure 1 is a side elevation partly in section of a preferred embodiment of the portable projector assembly of my invention with the parts in carrying condition and with the projector and slide carrier inside the case.

Figure 2 is an elevation partly in section illustrating the projector assembly in picture projecting and viewing condition with the carrying case held open and the projector shifted to locate it at the proper distance from the screen.

Figure 3 is a top plan view of the bottom section of the carrying case, the projector and its slidable support plate being omitted.

Figure 4 is an end elevation of the case bottom section of Figure 3, illustrating especially the grooved slide guide for the projector support plate.

Our portable projector assembly comprises a carrying case, the body of which is indicated at 10, provided with a removable end section 11 which is clamped to body 10 by a plurality of suitable manually releasable clamps, one of which is indicated at 12', when the assembly is in carrying condition as in Figure 1. As shown at 12 in Figure 1, the walls of body 10 and end section 11 have cooperating interfitting deeply bevelled edges which guide and assist quick assembly of the body and end section, and aid the clamps in holding these parts together while the assembly is being carried about.

End section 11 comprises a relatively shallow tray fitted with a plurality of intersecting walls 13 and 14 providing a large number of compartments for holding picture slides. As shown in Figure 1, the outer end wall 15 of section 11 is provided with corner buttons 16 for supporting it as a tray when removed from the casing body and placed on the table beside the assembly of Figure 2 so as to be convenient to the projector operator.

Casing body 10 comprises a top wall 17, a closure end wall 18, a bottom wall 19 and a pair of side walls 20 and 21. A carrying handle 22 is secured to top wall 17 in a suitable manner. Top wall 17, end wall 18 and the side walls of the casing are rigidly secured together and comprise what will be referred to as the upper section of the casing. This section may comprise an integral shell if desired and it is pivotally secured, as by hinge 23, to one end of bottom wall 19 which comprises the lower section of the casing. Wall 19 is provided with corner support buttons 24 and fits snugly and telescopingly between the lower ends of the casing side walls (Figure 4) with the axis of hinge 23 well below wall 19 to permit the sections to pivot freely about the hinge.

The upper left-hand corner of the casing body is bridged by an inclined bracket 25 extending rigidly between walls 17 and 18. A reflector 26 of any suitable type having its reflecting surface facing into the interior of the body is securely fastened upon bracket 25. Preferably reflector 26 is simply an inexpensive plane mirror held along its edges. If desired, end wall 18 may be inclined at the angle of bracket 25 so as to eliminate bracket 25 and reflector 26 mounted directly on the inner face of wall 18.

Opposite wall 18, the other end of casing body 10 is closed by a ground glass viewing screen 27 which is preferably seated in grooves cut into the interior surfaces of the top and side walls and held therein by a similarly grooved ledge 28 extending between the lower ends of the side walls adjacent joint 12. Ledge 28 is made rigid with the side walls so that it braces the open end of the upper casing body section, and it rests on the upper surface of wall 19 when the parts are folded as in Figure 1.

A metal strip 29 extends along the inner side of ledge 28, being secured thereto as by screws 30. At its opposite ends, strip 29 is formed with rearwardly bent arms 31 which are secured as by screws 32 to side walls 20 and 21, respectively. As shown in Figure 2, one arm 31 is formed at its inner end with an inwardly turned integral stop member 33 extending a short distance into the interior of the casing.

Referring to Figure 4, bottom wall 19 has rigidly secured thereto at opposite side edges a pair of upstanding longitudinal plates 34 and 35. As shown in Figures 1 and 2 these plates are formed with horizontal ledges 36 and 37 of the same height and ledge 37 which is on the same side of the assembly as stop member 33 carries a short longitudinally slidable rigid catch bar 38. As shown in Figures 3 and 4, catch bar 38 comprises a small metal angle having an upstanding leg 39 and a horizontal leg 40 formed with spaced longitudinal slots 41 and 42. Suitable screws 43 and 44 on ledge 37 pass through slots 41 and 42 and, although headed to prevent detachment of bar 38 from plate 35, these screws cooperate with slots 42 to provide a loose slide connection enabling catch bar 38 to be shifted between the retracted position of Figure 2 and the advanced position illustrated in dotted lines in Figures 2 and 3. Plates 34 and 35 are formed with inclined faces 45 and 46 respectively leading from ledges 36 and 37 downwardly to points adjacent hinge 23.

Interiorly of plates 34 and 35, wall 19 is provided with a pair of longitudinal guide members 47 and 48 formed with guide grooves 49 and 50 facing each other. Above members 47 and 48, plates 34 and 35 have secured thereto a pair of blocks 51 and 52 bearing T-shaped socket formations 53 and 54, the purpose of which will later be described.

A support plate 55, preferably comprising a flat rectangular board, has its side edges suitably fitted within grooves 49 and 50 whereby it is slidable longitudinally of the casing body. At its outer end, plate 55 is formed with a central aperture 56 provided with an internally threaded metal collar 57 adapted to receive a levelling screw 58 having spaced similarly threaded portions 59 and 61, a lower end button 62 and a knurled top 63. Plate 55 is provided substantially at its center with a stud receiving aperture 64.

Plate 55 carries a complete picture projection unit comprising a base 65 provided with corner leg supports 66, a lamp house 67, a removable slide carrier 68 and a lens barrel 69 collapsible into boss 71, the unit resting thereupon on legs 66 and being secured against movement thereon by stud 72 which extends through aperture 64 into threaded engagement with a suitable fitting such as an ordinary camera tripod mounting socket in the bottom of base 65. Slide carrier 68 is provided with a rectangular socket element 70 by which it is mounted on a correspondingly shaped formation on the inner end of boss 71. Socket 70 is of such size and shape as to fit over formations 53 and 54 whereby the slide carrier may be stored as a unit upon blocks 51 or 52 when not in use (see Figure 1). Alternatively a film carrier having a socket similar to socket 70 may be mounted for projection or stored on blocks 51 or 52. Since the nature of the projector mounted on plate 55 does not form part of the present invention, further description thereof is deemed unnecessary, it being sufficient to state that any projector of suitable size can be used.

With the parts in carrying condition as in Figure 1, plate 55 and the projector thereon are housed and protected by casing body 10. End section 11 closes the open end of the casing body to thereby protect screen 27 against dirt and injury, and it also serves to hold the upper and lower hinged sections of casing body 10 in the folded position of Figure 1. If desired, an auxiliary latch may be provided for holding wall 19 to the upper section of body 10, but as a practical matter we have found the deep bevelled joint 12 and the fastening members 12' to be sufficient.

Under the conditions of Figure 1, levelling screw 58 is positively held in its upper inoperative position where it clears wall 19 and cannot interfere with sliding of plate 55, by engagement of threaded portion 61 with collar 57. Slide holder 68 is carried on block 52 as shown in Figure 1.

When it is desired to use the assembly, the case is laid on a flat topped table or like platform, supported on buttons 24. The fastenings 12' are first released, and end section 11 is removed and placed upright on buttons 16 beside the body of the case.

Then the upper section of case body 10 is swung upwardly about hinge 23, wall 19 remaining on the table top and being held there mainly by the weight of the projector, until stop member 33 is above catch bar 38. At this point, the operator simply reaches in to slide bar 38 to its foremost position of Figure 2, and then allows the raised upper section to drop gently back toward the table until stop member 33, which normally clears the catch bar in the position of Figure 1, engages leg 39 of the catch bar to thereby positively maintain the upper body section at a selected angle (about 30°) to the horizontal. This positively and automatically locates and maintains the viewing screen at about 60° to the horizontal projector axis. Because of the offset location of hinge 23, it is possible to tilt the upper section back until end wall 18 rests flat on the table where the upper section will maintain itself upright to expose the projector and other parts within the casing to handling by the operator.

Plate 55 is then slid rearwardly partially out of the casing into the position of Figure 2, wherein its front end is supported by wall 19 and its rear end is supported by screw 58 which has been dropped until button 62 contacts the table top and threaded portion 59 is engaged with collar 57. By manipulating levelling screw 58, the rear end of plate 55 can be adjustably supported until lens barrel 69 is horizontal. After plate 55 has been levelled, slide carrier 68 is mounted on boss 71 and lens barrel 69 is manipulated until the projected image is focused clearly on screen 27, there to be viewed by an observer facing right to left in Figure 2.

Reflector 26 is of sufficient size and disposed at such an angle with respect to the axis of the projector that the image from the projector is completely and centrally thrown on screen 27.

Since the casing may be mainly of wood, our projector assembly is light-weight and inexpensive. It is self contained, with the projector, the screen, supports and the picture slides all carried in a compact box-like casing which is easily and quickly opened and placed in operation as above described, with positive arrangements for insuring that the viewing screen and the projector are properly located.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A portable projector casing comprising a housing; a base operative to support a projector in an inoperative position entirely within said housing or in an operative position at least partially outside of said housing; said housing having a size such that when closed with said base a projector in inoperative position on said base obstructs the space between the ends of said housing; a hinge connection between one end of said housing and said base; a reflector within said housing at the hinge end thereof; and a screen in the opposite end of said housing; said housing being tiltable relative to said base about said hinge connection to move said opposite end thereof out of the path of a projector when moved between said operative and said inoperative projector position.

2. A portable projector casing comprising a base operative to support a projector; a housing of a size such that a projector mounted on said base obstructs the space between the ends thereof, operatively connected to said base by a hinge connection at one end thereof closable with said base to enclose a projector thereon; a reflector at the hinged end of said housing; a screen in the opposite end thereof; said housing being tiltable relative to said base to move said screen to an operative position above the projector; and means on said base operative to support said projector either within said housing or in a position clear of the space between said reflector and said screen when said housing in tilted relative to said base.

3. A portable projector casing comprising substantially parallel top and bottom walls, side walls and at least one end wall, said end wall being rigidly secured to said top and side walls; a reflector adjacent said one end wall and a screen at the opposite end of said casing, said casing being of a size such that a projector therein obstructs the space between said reflector and said screen; means pivotally connecting said one end wall to said bottom wall so that said top, side and end walls may be rocked as a unit to move said screen to a position above the space obstructed by said projector without disturbing the fixed relationship between said reflector and said screen; and means connected with said bottom wall supporting said projector in an operative position entirely clear of the space between said reflector and said screen when said screen is raised.

4. A portable projector casing comprising three unitary parts wherein one of said parts constitutes a base supporting a projector; a second part comprises a housing cooperating with said base to enclose the projector and carrying a reflector at one end and a screen at the opposite end, the size of said housing being such that the projector obstructs the space between said reflector and said screen when said housing is closed on said base; and said third part comprises a removable end portion operative to cover said screen and secure said housing in closed relationship on said base when said third part is operatively associated in closing relationship with corresponding ends of said housing and said base; means pivotally connecting said housing to said base for tilting movement about an axis located adjacent said reflector to move said screen to a position above the space obstructed by said projector; and means for supporting said projector on said base in a position clear of the space between said reflector and said screen when said housing is tilted.

5. In a portable projector assembly, a casing comprising a body portion made up of pivotally interconnected sections adapted to house a projector unit, said pivotal connection being disposed adjacent one end of the casing, a translucent screen adjacent the other end of said casing, and a removable end section comprising a protective cover for said other end of said casing, said body portion and end section having coextensive walls provided with interengaging formations of such nature that said end section maintains said pivotally connected body sections in closed position when the former is fastened in place on said body portion.

6. In the portable projector assembly defined in claim 5, said interengaging formations comprising telescoping beveled edges on the contacting walls of said body portion and end section.

7. In a portable projector assembly, an openable casing body comprising pivotally interconnected upper and lower sections, said lower section including a bottom wall of said casing body and said upper section including the remaining walls of said casing body, a projector support slidably mounted on said lower section and a projector unit on said support, a translucent screen at one end of said upper section and a reflector at the other end of said upper section, and cooperating means on said sections maintaining said casing body open with said sections disposed in predetermined angular relation so that said reflector directs the projected image onto said screen.

8. In a portable projector assembly, a casing body comprising pivotally interconnected upper and lower sections, the lower section including a bottom wall of said casing body and serving as a projector support base and the upper section including the remaining walls of said casing body and carrying a translucent screen, a rigid stop member on said upper section, and a shiftable catch on said lower section adapted to engage said stop member and hold the sections in predetermined angular displacement.

9. In a portable projector assembly, an openable casing body comprising a lower section carrying a shiftable projector support pivotally connected to an upper screen-carrying section, a rigid stop member on the upper section, an upstanding member on the lower section, and a loosely slidable catch on said upstanding member adapted to be shifted into the path of said stop member to maintain the casing body open with said sections in predetermined angular displacement.

10. In a projector assembly, an openable casing body comprising pivotally interconnected upper and lower sections, said lower section being adapted to be placed on a table top or like platform, a projector support member slidably mounted on said lower section adapted to lie wholly within the casing body when the latter is closed and to be extended a substantial distance outwardly of said casing body with its trailing end supported by said lower section when the casing body is open, and means at the leading end of said member adapted to rest on said platform for supporting said leading end of said member.

11. In the projector device defined in claim 10, said means at the leading end of said member comprising an adjustable levelling device carried by said member.

12. In a projector assembly, a base adapted to be placed on a table top or like platform; a projector support member slidably mounted on said base and adapted to be extended a substantial distance outwardly of said base with its trailing end supported by said base; and an adjustable leveling screw carried by said member and having a formation engageable with said member for supporting the leading end of said member on said platform, said leveling screw having a second formation spaced from said first formation and engageable with said base when the member is in retracted position on said base.

CLINTON H. HARRIS.
JOHN N. GRAEF.